US012570118B2

(12) United States Patent
Möhring et al.

(10) Patent No.: US 12,570,118 B2
(45) Date of Patent: Mar. 10, 2026

(54) FLUID SYSTEM FOR A VEHICLE

(71) Applicant: ECO Holding 1 GmbH, Marktheidenfeld (DE)

(72) Inventors: Jens Möhring, Nürtingen (DE); Dietmar Schulze, Münzenberg (DE); Andre Selke, Lohr (DE)

(73) Assignee: ECO Holding 1 GmbH (DE)

( * ) Notice: Subject to any disclaimer, the term of this patent is extended or adjusted under 35 U.S.C. 154(b) by 0 days.

(21) Appl. No.: 18/849,829

(22) PCT Filed: Feb. 28, 2023

(86) PCT No.: PCT/EP2023/054902
§ 371 (c)(1),
(2) Date: Sep. 23, 2024

(87) PCT Pub. No.: WO2023/186430
PCT Pub. Date: Oct. 5, 2023

(65) Prior Publication Data
US 2025/0214386 A1      Jul. 3, 2025

(30) Foreign Application Priority Data

Mar. 31, 2022    (DE) ......................... 102022107713.6

(51) Int. Cl.
  B60G 17/015      (2006.01)
  B60G 17/017      (2006.01)
(52) U.S. Cl.
  CPC ....... B60G 17/0152 (2013.01); B60G 17/017 (2013.01); B60G 2202/413 (2013.01);
  (Continued)
(58) Field of Classification Search
  CPC ......................... B60G 17/015; B60G 17/0152; B60G 17/017; B60G 2202/413; B60G 2202/414;
  (Continued)

(56) References Cited

U.S. PATENT DOCUMENTS

| | | | | | |
|---|---|---|---|---|---|
| 2002/0149248 | A1* | 10/2002 | Jackson | ..................... | F15B 7/02 |
| | | | | | 297/330 |
| 2004/0113377 | A1* | 6/2004 | Klees | ................... | B60G 21/073 |
| | | | | | 280/5.514 |
| 2007/0170680 | A1* | 7/2007 | Knaap | .................. | B60G 17/056 |
| | | | | | 280/124.106 |
| 2017/0240019 | A1* | 8/2017 | Six | ..................... | B60G 17/0416 |
| 2017/0267050 | A1 | 9/2017 | Stolle | | |

(Continued)

FOREIGN PATENT DOCUMENTS

| | | | | |
|---|---|---|---|---|
| CN | 108798891 B | * 12/2020 | ................ | F16C 7/06 |
| DE | 102014018788 B3 | 12/2015 | | |

(Continued)

OTHER PUBLICATIONS

International Search Report for PCT/EP2023/054902 mailed May 10, 2023. 3 pages.

*Primary Examiner* — Keith J Frisby
(74) *Attorney, Agent, or Firm* — Lerner David LLP

(57) ABSTRACT
A fluid system for a vehicle, preferably for a vehicle chassis, includes: a pump for delivering a fluid, wherein the pump has a first fluid connection and a second fluid connection, an actuator which can be connected to the first fluid connection in a fluid-communicating manner via an actuator valve, wherein the pump is designed to deliver the fluid to be delivered in a first delivery direction and in a second delivery direction opposite the first delivery direction, so that the actuator is fluidically pressurized by the pump via the first fluid connection when the pump delivers in the first delivery direction, and the actuator is fluidically separated from the first fluid connection depending on the position of the actuator valve or the actuator is fluidically relieved by the pump via the first fluid connection when the pump delivers in the second delivery direction.

14 Claims, 1 Drawing Sheet

(52) U.S. Cl.
CPC .. *B60G 2202/414* (2013.01); *B60G 2202/416* (2013.01); *B60G 2204/47* (2013.01); *B60G 2204/80* (2013.01); *B60G 2400/252* (2013.01); *B60G 2500/30* (2013.01); *B60G 2600/182* (2013.01); *B60G 2800/20* (2013.01); *B60G 2800/914* (2013.01); *F15B 2211/30525* (2013.01)

(58) Field of Classification Search
CPC ........ B60G 2202/416; B60G 2202/415; B60G 2204/47; B60G 2204/80; B60G 2400/252; B60G 2500/30; B60G 2600/18; B60G 2600/182; B60G 2800/20; B60G 2800/914; F15B 2211/30525
USPC .............. 280/6.157, 5.514, 124.157, 124.16, 280/124.159; 701/37
See application file for complete search history.

(56) References Cited

U.S. PATENT DOCUMENTS

| | | | | |
|---|---|---|---|---|
| 2018/0037083 | A1* | 2/2018 | Seminara | B60G 17/0408 |
| 2023/0112405 | A1* | 4/2023 | Calchand | B60G 11/265 |
| | | | | 280/5.515 |
| 2023/0294476 | A1* | 9/2023 | Birch | B60G 21/073 |
| | | | | 280/5.515 |

FOREIGN PATENT DOCUMENTS

| | | | | |
|---|---|---|---|---|
| DE | 102017103915 | A1 * | 8/2017 | ............... F15B 1/04 |
| DE | 102017121499 | B3 * | 8/2018 | ............. E05F 15/53 |
| DE | 102017107994 | B4 | 4/2021 | |
| DE | 102020105270 | A1 | 9/2021 | |
| DE | 112020001989 | T5 * | 1/2022 | ............ B60G 17/08 |
| EP | 0803385 | A2 * | 10/1997 | ........... B60G 17/016 |
| JP | 2000264034 | A * | 9/2000 | |

* cited by examiner

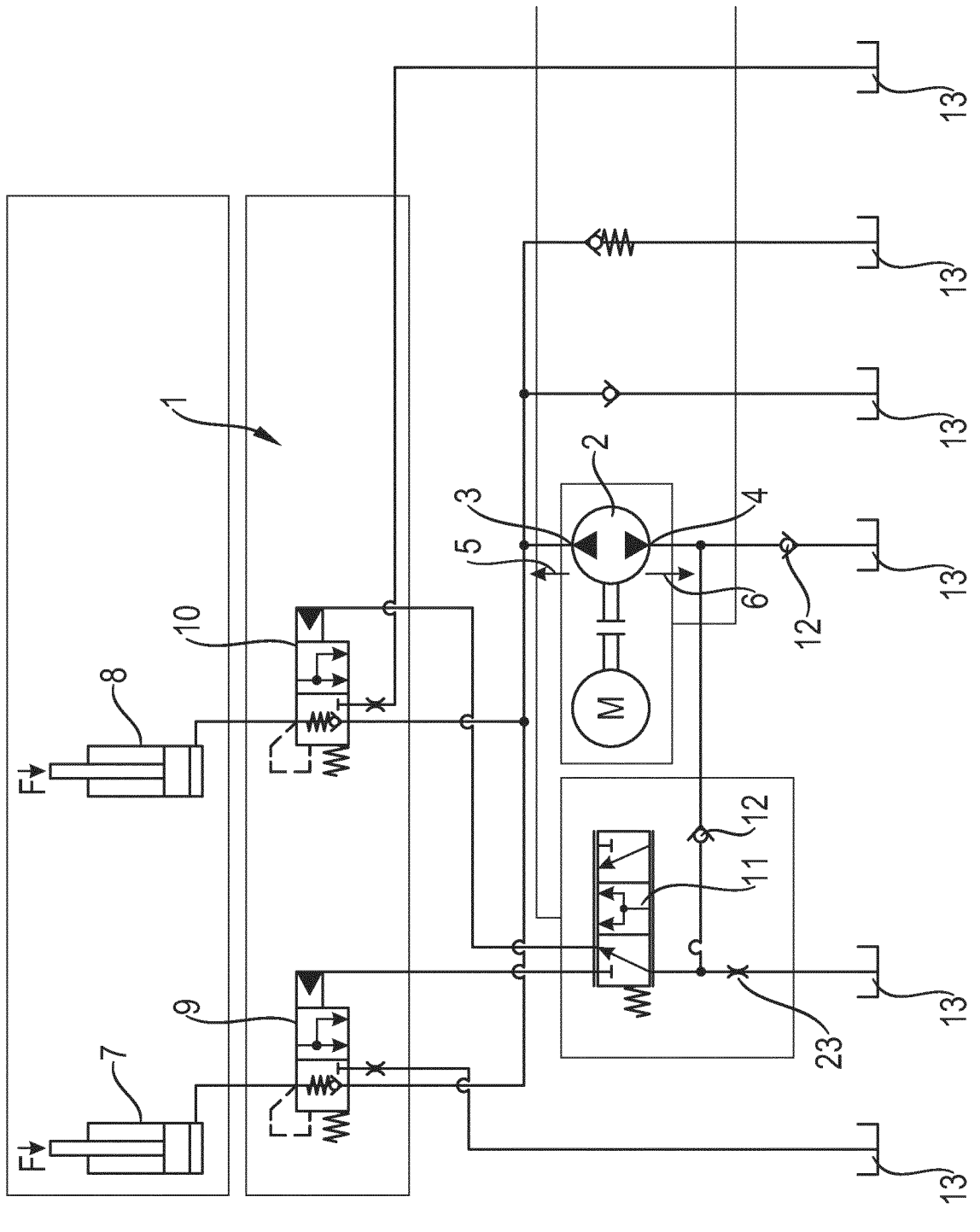

FLUID SYSTEM FOR A VEHICLE

CROSS-REFERENCE TO RELATED APPLICATIONS

The present application is a national phase entry under 35 U.S.C. § 371 of International Application No. PCT/EP2023/054902, filed Feb. 28, 2023, published in German, which claims priority to German Application No. 10 2022 107 713.6, filed Mar. 31, 2022, the disclosures of which are incorporated herein by reference in their entireties.

TECHNICAL FIELD

The invention relates to a fluid system for a vehicle, preferably for a vehicle chassis. The fluid system comprises a pump for delivering a fluid. In addition, the fluid system comprises an actuator, which can be connected to the pump in a fluid-communicating manner via an actuator valve in such a way that fluid pressure can be applied to the actuator by the pump.

PRIOR ART

Fluid systems of this type are known in the prior art. Pneumatic systems, that is to say compressed air systems, are regularly used particularly for use in vehicle chassis, for example in chassis of motor vehicles. The known pneumatic systems are constructed in such a way that an actuator is assigned to a shock absorber or at least to each vehicle axle in order to selectively raise and/or lower the vehicle.

In order to be able to raise the vehicle, pneumatic pressure is selectively applied to the actuators in each case by a pump. In order to be able to lower the vehicle, the pneumatic system regularly comprises a complex valve arrangement. The individual valves of this valve arrangement are controlled electronically in the prior art in order to regulate the raising and lowering of the respective actuators.

Furthermore, the lowering of the vehicle with known pneumatic systems always necessitates that the vehicle has a certain dead weight so that the actuators are compressed by the vehicle mass when the vehicle is lowered.

The fluid systems known from the prior art have the disadvantage that they usually require a complex valve arrangement. Furthermore, electronically controlled valves are relatively cost-intensive to produce and have a relatively high susceptibility to errors. Last but not least, the known pneumatic systems have the problem that lowering is often possible only to a limited extent. In particular when the vehicle is standing on a slope and/or at an angle, it cannot always be ensured that the actuators are compressed to the desired extent.

SUMMARY OF THE INVENTION

It is an object of the invention to provide a fluid system for a vehicle which at least partially overcomes the disadvantages from the prior art. It is in particular an object of the invention to provide a fluid system for a vehicle which can be produced cost-effectively, functions reliably and has a low susceptibility to errors during operation.

According to the invention, a fluid system for a vehicle, preferably for a vehicle chassis, is proposed. The fluid system can be, for example, a hydraulic system, wherein the fluid is preferably a hydraulic liquid, in particular a hydraulic oil. The fluid system comprises a pump for delivering a fluid, wherein the pump has a first fluid connection and a second fluid connection. The second fluid connection is preferably a different fluid connection with respect to the first fluid connection. In addition, the fluid system comprises an actuator which can be connected to the first fluid connection in a fluid-communicating manner via an actuator valve. The pump is designed to deliver the fluid to be delivered in a first delivery direction and in a second delivery direction opposite the first delivery direction. According to the invention, the actuator is fluidically pressurized via the first fluid connection when the pump delivers in the first delivery direction. When the pump delivers in the second delivery direction, the actuator is either fluidically separated from the first fluid connection depending on the position of the actuator valve or the actuator is fluidically relieved by the pump via the first fluid connection.

In the present case, the term actuator refers to a structural unit which converts a pressure change within the structural unit into a mechanical movement. The pressure change within the structural unit is preferably caused by a fluid pressure change within the structural unit. The "actuator" may, for example, be a hydraulic actuator.

In the present case, the term "fluidic relief" is understood to mean a hydrostatic relief in which the fluid pressure within the actuator is at least compensated by an external exertion of force on the actuator. According to the invention, the fluid pressure within the actuator is caused by the pump in addition or as an alternative to the external exertion of force, namely when the pump delivers in the second delivery direction.

The fluidic relief of the actuator by reversing the delivery direction of the pump has the effect that the actuator can be reliably relieved or compressed independently of the position, in particular the inclination, of the vehicle. Furthermore, in the fluid system according to the invention, the number of valves can be reduced to a minimum, which additionally reduces the production costs. Furthermore, in the fluid system according to the invention, the construction of the valves can be made less complex and therefore also relatively cost-effective to produce. The fluid system according to the invention has the additional advantage that it ensures a high reliability during operation at low production costs.

In an exemplary embodiment of the fluid system, the pump is designed such that the fluid to be delivered, preferably the hydraulic liquid, is delivered in the first delivery direction from the second fluid connection to the first fluid connection. In the second delivery direction, the fluid to be delivered, in particular the hydraulic liquid, can be delivered from the first fluid connection to the second fluid connection. In other words, the second fluid connection can be a low-pressure inlet of the pump when the pump delivers the fluid to be delivered in the first delivery direction. At the same time, the first fluid connection can form a high-pressure outlet of the pump when the pump delivers the fluid to be delivered in the first delivery direction. When the pump delivers the fluid to be delivered in the second delivery direction, the second fluid connection can form a high-pressure outlet of the pump, while the first fluid connection can be a low-pressure inlet of the pump. The exemplary embodiment advantageously has the effect that exclusively the two delivery connections have to be provided on the pump for the different delivery directions. This has the advantage that the structural construction of the pump can be made relatively simple and therefore particularly cost-effective.

In a further exemplary embodiment, the pump is a rotary pump. The pump can be, for example, an internal gear pump, an external gear pump or a rotary vane pump. The pump is preferably a rotary vane pump. If the pump is designed as a rotary pump, a change in the delivery direction can be caused by a change in the direction of rotation of the pump. This achieves, for example, the technical advantage that the pump can be used much more efficiently in the fluid system. This is due to the fact that the suction and the pressure functionality of the pump can be actively utilized directly. Accordingly, such a pump has the advantage that no additional valves and/or no additional pumps are required for the fluidic relief. Rather, it may be sufficient to connect the pump to the actuator in a fluid-communicating manner.

The actuator valve can be designed such that the actuator valve is movable or switchable back and forth between a first actuator valve position and a second actuator valve position, in particular a second actuator valve position different from the first actuator valve position. Preferably, the actuator valve forms a check valve in the first actuator valve position. For this purpose, the actuator valve can have a closing element, for example a ball, which can change back and forth between a blocking position and a throughflow position. In the blocking position, the closing element preferably prevents a fluid flow through the actuator valve. In the throughflow position, the fluid, in particular the hydraulic fluid, can flow through the actuator valve. Preferably, the flow pressure created by the fluid flow on the blocking body causes the blocking body to be pressed into the blocking position or into the throughflow position, depending on the flow direction.

The actuator valve can also be designed, for example, such that the actuator valve forms a check valve in the first actuator valve position. For this purpose, the actuator valve can have a resetting element in addition to the closing element. The resetting element can be designed to exert a resetting force on the blocking body. Preferably, the resetting force causes the blocking body to be pressed into the blocking position. A predefined flow pressure of the fluid flow can cause the blocking body to be pressed into the throughflow position against the resetting force of the resetting element. The resetting element can be, in particular, a spring, the spring force of which presses the blocking body into the blocking position. In addition or as an alternative, the actuator valve can be designed such that the actuator valve forms a fluid passage in the second actuator valve position. This means that the fluid can flow out of the actuator in the second actuator position.

An actuator valve as described in the preceding paragraphs has the advantage that the actuator valve can be produced simply and cost-effectively. Furthermore, such an actuator valve, in particular in conjunction with a pump which can deliver in two opposite delivery directions, can ensure particularly reliable fluidic pressurization, blocking and/or relief of an actuator.

For example, the first actuator valve and/or the second actuator valve each comprise a pin-shaped extension which is designed for transferring a closing element from a closed position, in which the closing element rests in a valve seat, into an open position, in which the closing element is spaced apart from the valve seat. The valve prevents fluid from escaping from the first actuator via the first actuator valve or from the second actuator via the second actuator valve. In principle, no additional resetting spring is necessary for this purpose. Thus, the actuators remain closed in the switched-off state of the entire fluid system, which has the advantage in the specific application in a vehicle chassis that a stable chassis state is achieved when the vehicle is parked. Thus, the closing element remains in principle in the closed state due to the internal pressure of the actuator, wherein the internal pressure of the actuator is caused by the dead weight of the vehicle. When the first actuator valve and/or the second actuator valve are actuated by the corresponding switching position of the control valve, the pin-shaped extension acts directly on the closing element and lifts the closing element from the valve seat.

In a further exemplary embodiment, the fluid system has a control valve. The control valve is preferably designed to control the actuator valve, in particular to fluidically control the actuator valve. The control valve can be connected to the second fluid connection of the pump in a fluid-communicating manner when the pump delivers in the second delivery direction. When the pump delivers in the first delivery direction, the control valve is preferably fluidically separated from the second fluid connection of the pump. This can be ensured, for example, by a check valve being provided between the control valve and the second fluid connection of the pump.

The control valve can be designed to fluidically connect a control connection of the actuator valve to the second fluid connection of the pump when the pump delivers in the second delivery direction. The control valve preferably fluidically connects the control connection of the actuator valve to the second fluid connection of the pump when the control valve is in a first control valve position. When the control connection of the actuator valve is fluidically connected to the second fluid connection of the pump, the fluid pressure at the control connection of the actuator valve can exert a control pressure on the actuator valve. The control pressure preferably causes the actuator valve to change the actuator valve position, in particular to change from the first actuator valve position into the second actuator valve position.

The control valve can be designed to fluidically separate the control connection of the actuator valve from the second fluid connection of the pump when the pump delivers in the second delivery direction. In the first switching position of the control valve, the control connection of the second actuator valve is preferably fluidically connected to the second connection of the pump. In the second switching position of the control valve, both actuator valves are connected to the pump and in the third position of the control valve, the second actuator valve is separated from the pump and only the first actuator valve remains connected.

A control valve for controlling the actuator valve, in particular for fluidically controlling the actuator valve, can advantageously cause the actuator valve not to have to be controlled electronically. This has the advantage that electronic components on the actuator valve can be omitted and the production costs and the failure probabilities of the actuator valve are thereby reduced.

For example, the control valve is hydraulically controllable. This achieves, for example, the technical advantage that complex control devices are no longer required for controlling the control valve. For example, the control valve can be controlled via different fluid pressures which are achieved via a targeted control of the rotation rate of the assigned pump. Thus, fluid can be delivered by the pump in the second delivery direction, wherein the rotation rate of the pump correlates with a specific fluid pressure on the control valve. A specific applied fluid pressure thus corresponds to a specific switching position. Hydraulic fluid flows out of the control valve back into a reservoir via an orifice opening. This can take place, for example, independently of the rotation rate of the pump and thus also independently of the pressure level applied to the radial opening.

In an exemplary further development of the fluid system, the fluid system comprises a measuring device. The measuring device is preferably designed to determine the setting position of the actuator.

In addition, the fluid system can have a feedback control device. The feedback control device and the measuring device are preferably connected to one another in an information-communicating manner. As a result, it is possible, for example, for the measuring device to transmit the specific setting position of the actuator to the feedback control device. The feedback control device can be designed to control the actuator valve and/or the control valve on the basis of the specific setting position, so that the setting position of the actuator is controlled by the feedback control device.

In an embodiment with a measuring device and a feedback control device, the actuator can be controlled via a closed feedback control circuit. This has the advantage that the setting position of the actuator can be controlled particularly reliably.

In a further exemplary embodiment, the control valve can be electronically controllable. This means that in particular the control valve position of the control valve can be changed via an electronic input signal. For this purpose, the control valve can have an electronic control unit, for example.

As an alternative, the control valve can be fluidically controllable. This means that in particular the control valve position of the control valve can be changed via a fluidic control pressure. The control valve is preferably controllable as a function of the fluid pressure generated by the pump in the second delivery direction. For example, a control connection of the control valve can be fluidically connected to the second fluid connection of the pump. By varying the fluid pressure, in particular by varying the rotation rate of the pump, different pressure levels can then be applied to the control connection of the control valve. Thus, fluid can be delivered by the pump in the second delivery direction, wherein the rotation rate of the pump correlates with a specific fluid pressure on the control valve. A specific applied fluid pressure thus corresponds to a specific switching position. Hydraulic fluid flows out of the control valve back into a reservoir via an orifice opening. This can take place, for example, independently of the rotation rate of the pump and thus also independently of the pressure level applied to the radial opening.

Each pressure level preferably corresponds to a control valve position of the control valve.

Such an embodiment has the advantage that the position of the actuator can be controlled via the change in the delivery direction of the pump and via the fluid pressure provided by the pump. The electronic components of the fluid system can thereby be reduced to an absolute minimum, which considerably reduces the production costs and the susceptibility to errors of the fluid system.

In an advantageous further development, the fluid system comprises a plurality of actuators. Each of the actuators can preferably be connected to the first fluid connection in a fluid-communicating manner via a respective actuator valve. Such a further development advantageously has the effect that a plurality of actuators can be fluidically pressurized and/or fluidically relieved by a single pump. This has the advantage that the number of components, in particular the number of pumps required, and thus also the production costs of the fluid system can be reduced.

In an embodiment in which the fluid system has a control valve and a plurality of actuators with a plurality of actuator valves, the control valve can be designed to control all the actuator valves, preferably to fluidically control all the actuator valves. Such an embodiment advantageously has the effect that a plurality of actuator valves can be controlled by a single control valve. In this respect, the actuator positions of the plurality of actuators can also be controlled via a single control valve. This has the advantage that the number of components, and thus also the production costs of the fluid system, can be reduced.

The fluid system can have, for example, a first actuator and a second actuator which is different from the first actuator. The first actuator can be connected to the first fluid connection of the pump in a fluid-communicating manner, in particular via a first actuator valve. The second actuator can be connected to the first fluid connection of the pump in a fluid-communicating manner via a second actuator valve. Preferably, the first actuator valve and the second actuator valve are separated from one another. The control valve of the fluid system can be connected to the second fluid connection of the pump in a fluid-communicating manner and is preferably designed to control the first actuator valve and/or the second actuator valve.

In the aforementioned exemplary fluid systems, the control valve can be designed, for example, as a 4/3 directional control valve.

Preferably, the second fluid connection of the pump can be connected to a reservoir, in particular a fluid reservoir, in a fluid-communicating manner via a check valve. For example, the check valve can be designed such that it connects the second fluid connection of the pump to the reservoir in a fluid-communicating manner when the pump delivers in the first delivery direction. When the pump delivers in the second delivery direction, the check valve can fluidically separate the second fluid connection of the pump from the reservoir.

Such a check valve advantageously has the effect that the pump can suck in the fluid to be delivered from the reservoir when the pump delivers in the first delivery direction. When the pump delivers in the second delivery direction, the check valve can prevent the pump from pumping the fluid to be delivered into the reservoir. This has the advantage that the fluid pressure generated by the pump is not lost, but rather is maintained in the fluid system when the pump delivers in the second delivery direction. Thus, the delivery pressure in the delivery system can be used as control pressure, in particular to control the actuator valves.

As already mentioned several times above, the fluid in the fluid system can be a hydraulic fluid, in particular a hydraulic oil. As compared to a gas, a hydraulic liquid has a lower compressibility. Accordingly, the actuators can be controlled more simply and more effectively with a hydraulic liquid.

The fluid system can be provided for use in a vehicle, in particular in a motor vehicle. The fluid system can be provided, for example, in the chassis of a vehicle, in particular of a motor vehicle. Preferably, the actuator of the fluid system forms a suspension strut actuator of a vehicle chassis, in particular of a motor vehicle chassis. As an alternative, the actuator can also be assigned to a vehicle axle.

BRIEF DESCRIPTION OF THE DRAWINGS

The above-described, different and exemplary features can be combined with one another according to the invention, insofar as this is technically meaningful and suitable. Further features, advantages and embodiments of the invention are apparent from the following description of an exemplary embodiment and with reference to the drawing. In the drawing:

FIG. 1 shows a schematic hydraulic chart of an exemplary embodiment of a fluid system.

WAYS OF CARRYING OUT THE INVENTION

FIG. 1 shows an exemplary embodiment of a fluid system 1. In the first exemplary embodiment, the fluid to be delivered is a hydraulic fluid, in particular a hydraulic liquid. Accordingly, FIG. 1 also shows a schematic hydraulic chart. In principle, the symbols in the hydraulic chart shown in FIG. 1 correspond to the general symbols of a hydraulic chart known in mechanical engineering. For example, hydraulic conduits are represented by the lines. The fluid system 1 represented in FIG. 1 comprises a pump 2, a first actuator 7 and a second actuator 8.

The pump 2 is designed to deliver a hydraulic fluid and has a first fluid connection 3 and a second fluid connection 4 for this purpose. The pump 2 can be, for example, an internal gear pump, an external gear pump or a rotary vane pump. In a first delivery direction 5, the pump 2 delivers the hydraulic fluid from the second fluid connection 4 to the first fluid connection 3. This means that in the first delivery direction 5, the second fluid connection 4 forms a low-pressure connection of the pump 2. The first fluid connection 3 forms a high-pressure connection of the pump 2 in the first delivery direction 5. The pump 2 is furthermore designed to reverse the delivery direction. In other words, the pump 2 can have a second delivery direction 6. In the second delivery direction 6, the pump 2 delivers the hydraulic fluid from the first fluid connection 3 to the second fluid connection 4. In the second delivery direction 6, the first fluid connection 3 forms a low-pressure connection and the second fluid connection 4 forms a high-pressure connection of the pump 2. To reverse the delivery direction, it can be provided, for example, that the pump 2 changes its direction of rotation.

The first actuator 7 can be, for example, a first actuator 7 in a chassis of a vehicle. The first actuator 7 can be arranged, in particular, on a shock absorber of a vehicle. The first actuator 7 is connected to the first fluid connection 3 of the pump 2 via a first actuator valve 9.

The first actuator valve 9 can be moved or switched back and forth between two different actuator valve positions, namely a first actuator valve position and a second actuator valve position different from the first actuator valve position.

In FIG. 1, the first actuator valve 9 is shown in the first actuator valve position. In the first actuator valve position, the first actuator valve 9 forms a check valve. For this purpose, the first actuator valve 9 has a blocking element (not shown). The check valve is designed such that the existing internal pressure of the actuator presses the blocking element into a blocking position. For example, the check valve could additionally be spring-loaded. If the blocking element assumes the blocking position, the first actuator valve 9 acts like a blocking valve in the first actuator valve position. This means that a fluid communication between the first actuator 7 and the first fluid connection 3 of the pump 2 is prevented by the first actuator valve 9 in the first actuator valve position. This is the case in particular when the pump 2 delivers the hydraulic fluid in the second delivery direction 6. In this case, the pump 2 sucks hydraulic fluid via the first fluid connection 3. The negative pressure created by the suction effect interacts at the first actuator valve 9 with the internal pressure of the first actuator 7 in such a way that the blocking element is pressed into the blocking position. No fluid communication is possible between the first actuator 7 and the first fluid connection 3 of the pump 2 when the first actuator valve 9 is in the first actuator valve position and the pump 2 delivers in the second delivery direction 6.

In the first actuator valve position, the check valve of the first actuator valve 9 permits a fluid communication between the first actuator 7 and the first fluid connection 3 of the pump 2 when the pump 2 delivers the hydraulic fluid in the first delivery direction 5. This is caused due to the fact that the hydraulic fluid flowing in from the first fluid connection 3 of the pump 2 is under such a pressure that the hydraulic fluid presses the blocking element into a throughflow position against the internal pressure of the first actuator 7. In the throughflow position, the first actuator valve 9 forms a fluid passage. In other words, the hydraulic fluid can flow from the first fluid connection 3 via the first actuator valve 9 into the first actuator 7 and increase the oil volume within the first actuator 7 when the first actuator valve 9 is in the first actuator valve position and the pump 2 delivers the hydraulic fluid in the first delivery direction 5.

In the second actuator valve position, the first actuator valve 9 forms a fluid passage. This means that the hydraulic fluid can flow out of the first actuator 7 in the direction of the reservoir 13 when the first actuator valve 9 is in the second actuator valve position. In the illustration shown in FIG. 1, the first actuator valve 9 would shift to the left in order to change from the first actuator valve position into the second actuator valve position. The first actuator 7 is fluidically relieved only when the pump 2 delivers the hydraulic fluid in the second delivery direction 6 and the first actuator valve 9 is in the second actuator valve position.

Independently of the first actuator 7, the second actuator 8 can form a second actuator 8 in a chassis of a vehicle. The second actuator 8 can be arranged, in particular, on a further shock absorber of a vehicle. The second actuator 8 is connected to the first fluid connection 3 of the pump 2 via a second actuator valve 10.

In the exemplary embodiment represented, the second actuator valve 10 is designed analogously to the first actuator valve 9.

The second actuator valve 10 is also shown in a first actuator valve position in FIG. 1. In the first actuator valve position, the second actuator valve 10 forms a check valve analogously to the first actuator valve 9. In the first actuator valve position, the second actuator valve 10 acts like a blocking valve when the pump 2 delivers in the second delivery direction 6. This means that a fluid communication between the second actuator 8 and the first fluid connection 3 of the pump 2 is prevented by the second actuator valve 10 in the first actuator valve position when the pump 2 delivers in the second delivery direction 6.

In the first actuator valve position, the check valve of the second actuator valve 10 permits a fluid communication between the second actuator 8 and the first fluid connection 3 of the pump 2 when the pump 2 delivers the hydraulic fluid in the first delivery direction 5. In other words, the hydraulic fluid can flow from the first fluid connection 3 of the pump 2 via the second actuator valve 10 into the second actuator 8 and can apply hydraulic pressure to the latter when the second actuator valve 10 is in the first actuator valve position and the pump 2 delivers the hydraulic fluid in the first delivery direction 5.

In the second actuator valve position, the second actuator valve 10 forms a fluid passage analogously to the first actuator valve 9. This means that the hydraulic fluid can flow starting from the second actuator 8 in the direction of the reservoir 13 when the second actuator valve 10 is in the second actuator valve position. In the illustration shown in FIG. 1, the second actuator valve 10 would shift to the left in order to change from the first actuator valve position into the second actuator valve position. The second actuator 8 is fluidically relieved only when the second actuator valve 10 is in the second actuator valve position and the pump 2 delivers the hydraulic fluid in the second delivery direction 6.

In the exemplary embodiment shown in FIG. 1, the two actuator valves 9, 10 are hydraulically controllable. This means that the first actuator valve 9 and/or the second actuator valve 10 can be moved or switched back and forth between the first actuator valve position and the second actuator valve position via hydraulic actuation. For this purpose, the first actuator valve 9 and the second actuator valve 10 each have a control connection (shown on the right of the corresponding actuator valve 9, 10 in FIG. 1). To control the actuator valve positions of the two actuator valves 9, 10, the fluid system 1 has a control valve 11. In the shown exemplary embodiment, the control valve 11 is designed as a 4/3 directional control valve. The control valve 11 is connected to the second fluid connection 4 of the pump 2 via a check valve 12. The check valve 12 has the effect that when the pump 2 delivers the hydraulic fluid in the first delivery direction 5, the control valve 11 is fluidically separated from the second fluid connection 4 of the pump 2. However, when the pump 2 delivers the hydraulic fluid in the second delivery direction 6, the control valve 11 and the second fluid connection 4 of the pump 2 are fluidically connected to one another via the check valve 12. This means that the hydraulic fluid under pressure passes from the second fluid connection 4 of the pump 2 to the control valve 11 when the pump 2 delivers the hydraulic fluid in the second delivery direction 6.

The control valve 11 is movable or switchable back and forth between three different control valve positions, namely a first control valve position, a second control valve position and a third control valve position. To illustrate the mode of operation of the control valve 11, it is assumed for the following explanations that the pump 2 delivers the hydraulic fluid in the second delivery direction 6.

FIG. 1 shows the control valve 11 in the first control valve position. In the first control valve position, the hydraulic fluid is conducted via the control valve 11 to the control connection of the second actuator valve 10. Due to the hydraulic pressure then applied to the control connection of the second actuator valve 10, the second actuator valve 10 is moved from the first actuator valve position into the second actuator valve position (not represented in FIG. 1). As a result, the second actuator 8 is fluidically relieved via the second actuator valve 10. The control connection of the first actuator valve 9 is connected to a reservoir 13 via the control valve 11 in the first control valve position. This means that the first actuator valve 9 remains in the first actuator valve position when the control valve 11 is in the first control valve position. When the control valve 11 is moved or switched into the second control valve position, the control valve 11 is designed to conduct the fluid pressure of the hydraulic liquid to the control connection of the first actuator valve 9 and to the control connection of the second actuator valve 10. In this case, both actuator valves 9, 10 would move from the first actuator valve position into the second actuator valve position. As a result, both the first actuator 7 and the second actuator 8 would be fluidically relieved.

When the control valve 11 is moved or switched into the third control valve position, the control valve 11 is designed to conduct the hydraulic fluid to the control connection of the first actuator valve 9. Due to the hydraulic pressure then applied to the control connection of the first actuator valve 9, the first actuator valve 9 is moved from the first actuator valve position into the second actuator valve position (not represented in FIG. 1). As a result, the first actuator 7 is fluidically relieved via the first actuator valve 9. The control connection of the second actuator valve 10 is connected to a reservoir 13 via the control valve 11 in the third control valve position. This means that the second actuator valve 10 remains in the first actuator valve position when the control valve 11 is in the third control valve position. In the shown exemplary embodiment, the control valve 11 can be electronically controlled or feedback controlled. In an alternative exemplary embodiment, the control valve 11 can also be hydraulically controlled or feedback controlled. For example, a control connection of the control valve 11 can be fluidically connected to the second fluid connection 4 of the pump 2. By varying the hydraulic pressure, for example by varying the rotation rate of the pump 2, different, in particular three different, pressure levels can then be applied to the control connection of the control valve 11. Each pressure level preferably corresponds to a control valve position of the control valve 11. The control valve 11 comprises an orifice opening 23 which allows hydraulic fluid to flow out of the control valve 11 into a reservoir 13. Thus, when hydraulic fluid is delivered by the pump 2 in the second delivery direction 6, the hydraulic fluid can flow into the reservoir 13 independently of the rotation rate of the pump 2, independently of the pressure level applied to the radial opening and independently of the control valve position of the control valve 11.

In an exemplary use of the first exemplary embodiment of the fluid system 1, it can be provided that each of the actuators 7, 8 is assigned to a vehicle axle and/or a wheel suspension of a vehicle. For example, each actuator can be a suspension strut actuator. As an alternative, each of the actuators 7, 8 can be assigned to a vehicle axle. During the starting process of the vehicle, it is conceivable, for example, for the pump 2 to deliver the hydraulic fluid in the first delivery direction 5. In this case, the pump 2 will suck in the hydraulic fluid from a reservoir 13 via the second fluid connection 4. In the first delivery direction 5, the pump 2 pumps the hydraulic fluid further into the fluid system 1 via the first fluid connection 3. As represented in FIG. 1, the two actuator valves 9, 10 are initially each in the first actuator valve position. This has the effect that the hydraulic fluid is pumped from the first fluid connection 3 of the pump 2 into the two actuators 7, 8, so that the vehicle is raised.

If a selective lowering of the vehicle is desired in the further course of time, the delivery direction of the pump 2 can be reversed, in particular can be reversed from the first delivery direction 5 into the second delivery direction 6. One of the two actuators 7, 8 can then be fluidically relieved via the control valve position of the control valve 11, in the manner described above. As an alternative, both actuators 7, 8 can also be fluidically relieved at the same time, namely when the control valve 11 is in the second control valve position.

The invention claimed is:

1. A fluid system for a vehicle, the fluid system comprising:

a pump for delivering a fluid, wherein the pump has a first fluid connection and a second fluid connection, an actuator configured to be connected to the first fluid connection in a fluid-communicating manner via an actuator valve, wherein the pump is configured to deliver the fluid to be delivered in a first delivery direction and in a second delivery direction opposite the first delivery direction, so that the actuator is fluidically pressurized by the pump via the first fluid connection when the pump delivers in the first delivery direction, and the actuator is fluidically separated from the first fluid connection depending on the position of the actuator valve or the actuator is fluidically relieved by the pump via the first fluid connection when the pump delivers in the second delivery direction, wherein the fluid system comprises a control valve for controlling the actuator valve, the control valve being connected to the second fluid connection via a check valve, and wherein the control valve is fluidically separated from the second fluid connection by the check valve when the pump delivers in the first delivery direction, and the control valve is connected to the second fluid connection in a fluid-communicating manner by the check valve when the pump delivers in the second delivery direction.

2. The fluid system according to claim 1, wherein the pump is configured such that the fluid to be delivered is delivered in the first delivery direction from the second fluid connection to the first fluid connection, and that the fluid to be delivered is delivered in the second delivery direction from the first fluid connection to the second fluid connection.

3. The fluid system according to claim 1, wherein the pump is a rotary pump or a rotary vane pump, wherein a change in the delivery direction is caused by a change in a direction of rotation of the rotary pump or the rotary vane pump.

4. The fluid system according to claim 1, wherein the actuator valve is switchable back and forth between a first actuator valve position and a second actuator valve position, and wherein the actuator valve forms a check valve or a spring-loaded check valve, in the first actuator valve position and forms a fluid passage in the second actuator valve position.

5. The fluid system according to claim 1, wherein a measuring device is configured to determine a setting position of the actuator and to transmit the setting position to a control device, and wherein the control device is configured to control the actuator valve and/or the control valve.

6. The fluid system according to claim 1, wherein the control valve is electronically controllable.

7. The fluid system according to claim 1, wherein the control valve is controllable as a function of a fluid pressure generated by the pump in the second delivery direction.

8. The fluid system according to claim 1, wherein the actuator comprises a plurality of actuators each configured to be connected to the first fluid connection in a fluid-communicating manner via a corresponding actuator valve.

9. The fluid system according to claim 8, wherein the control valve is configured to control all the actuator valves.

10. The fluid system according to claim 1, wherein the actuator comprises:

a first actuator configured to be connected to the first fluid connection in a fluid-communicating manner via a first actuator valve, and a second actuator configured to be connected to the first fluid connection in a fluid-communicating manner via a second actuator valve, and wherein the control valve is configured to control at least one of the first actuator valve or the second actuator valve.

11. The fluid system according to claim 1, wherein the control valve is a 4/3 directional control valve.

12. The fluid system according to claim 1, wherein the second fluid connection is configured to be connected to a reservoir in a fluid-communicating manner via a check valve.

13. The fluid system according to claim 1, wherein the fluid in the fluid system is a hydraulic liquid or a hydraulic oil.

14. A chassis for a vehicle, wherein the chassis comprises a fluid system according to claim 1, and the actuator is a suspension strut actuator of the chassis.

\* \* \* \* \*